Aug. 21, 1956  G. M. BAIGENT  2,759,601
APPARATUS FOR OBSERVING AND/OR MEASURING LIGHT
Filed July 17, 1952  2 Sheets-Sheet 1
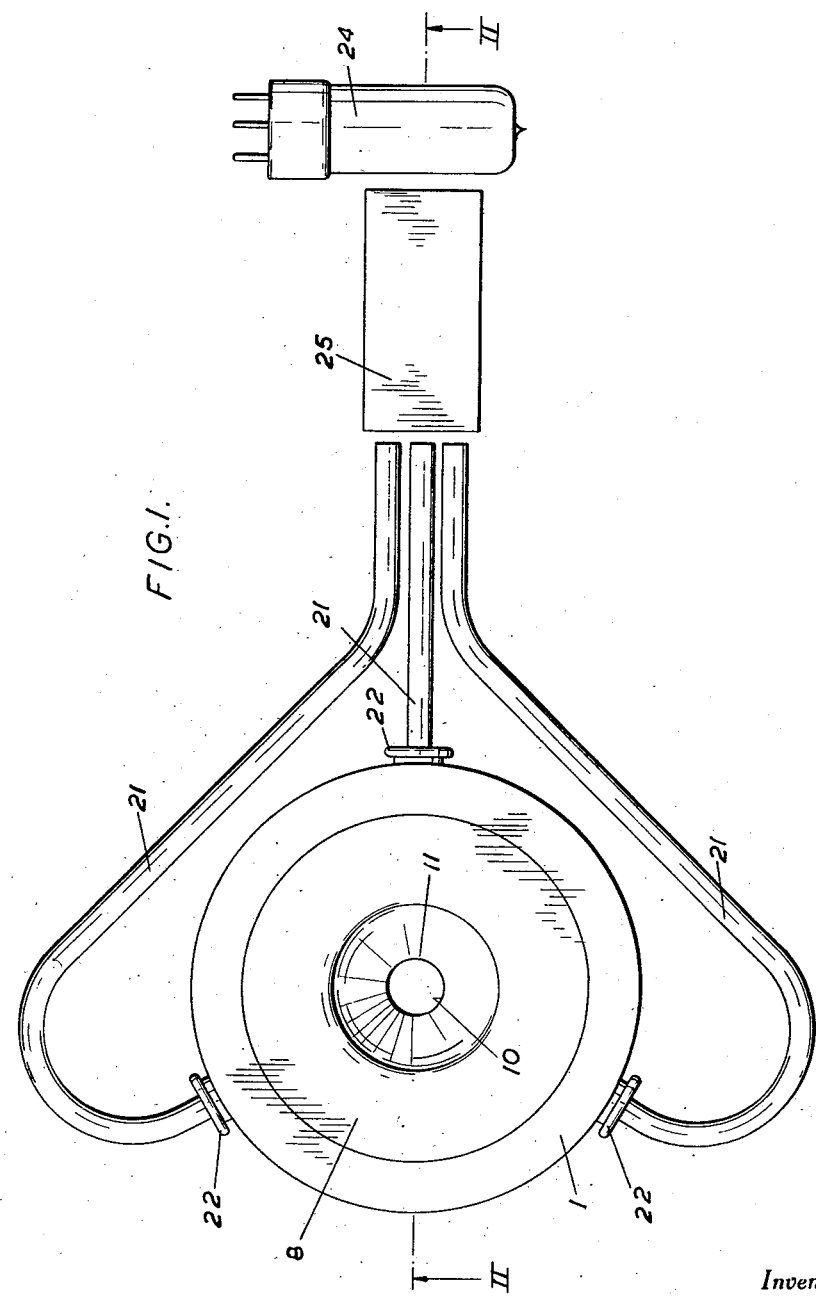
Inventor
George M. Baigent
By
Wenderoth, Lind + Ponack
Attorneys Aug. 21, 1956  G. M. BAIGENT  2,759,601
APPARATUS FOR OBSERVING AND/OR MEASURING LIGHT
Filed July 17, 1952  2 Sheets-Sheet 2
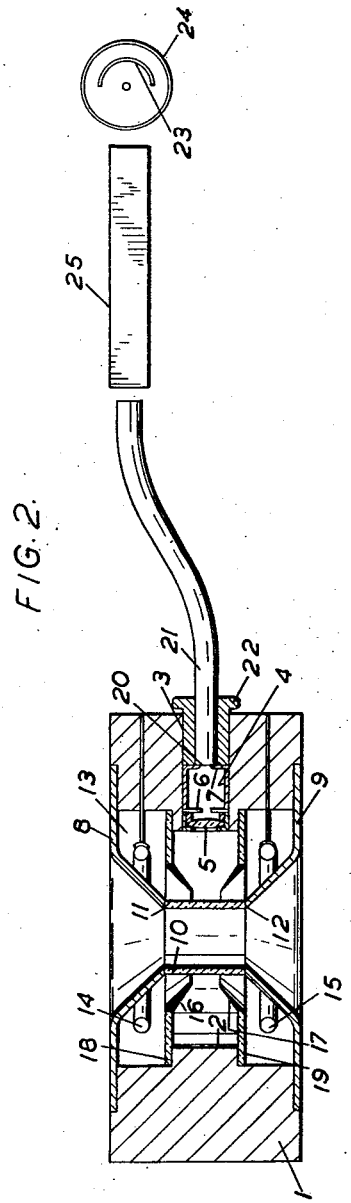
Inventor
George M. Baigent
By
Wenderoth, Lind + Ponack
Attorneys

United States Patent Office 2,759,601
Patented Aug. 21, 1956

2,759,601

APPARATUS FOR OBSERVING AND/OR MEASURING LIGHT

George Mattey Baigent, River Cottage, Bourne End, Buckinghamshire, England

Application July 17, 1952, Serial No. 299,477

Claims priority, application Great Britain July 19, 1951

9 Claims. (Cl. 209—111)

This invention is for improvements in or relating to apparatus for observing and/or measuring light, for example, light reflected from an article.

One object of the invention is to provide an arrangement whereby light may be observed and/or measured at a point remote from its source.

Another object is to overcome the disadvantages which arise in connection with, for example, the sorting of articles in accordance with their surface characteristics when such articles are viewed from a single viewpoint.

It will be understood that the reference to "light" throughout the specification are intended to include all kinds of light, whether white or colored and visible or invisible (e. g. ultra-violet), which emanates from a source of light or which is reflected from an object.

The expression "rod" as used herein is intended to cover solid rods, of any convenient cross-section, of transparent material, such as glass or polymethyl methacrylate, which may be highly polished or silvered so as to increase the amount of light conducted by internal reflection, and also to cover tubes of any convenient cross-section made of transparent or opaque material having an internally directed reflecting surface, for example, a metal tube having a polished internal surface or a glass tube silvered on one or other of its surfaces.

The following is a description of one embodiment of the invention with reference to the accompanying drawings in which:

Figure 1 is a plan view of the apparatus and

Figure 2 is a part sectional elevation on the line II—II of Figure 1.

A hollow cylinder 1 is coated on its interior surface 2 with a white paint and there are mounted, in holes 3 formed in the cylinder, three lens tubes 4 directed radially inwardly, each tube carrying a lens 5, a fieldstop 7 and an aperture stop 6.

Two dished apertured end discs 8 and 9 are secured to the cylinder 1 at the top and bottom thereof so as to enclose the said lens tubes 4 within a closed structure which is completed by means of a transparent tube 10 secured in the apertures 11 and 12 in the end discs 8 and 9 with its longitudinal axis parallel to the longitudinal axis of the cylinder 1.

Disposed within the enclosed space 13, thus constituted, are two circular vapor discharge tubes 14 and 15, one discharge tube 14 being disposed above and the other 15 being disposed below the three lens tubes 4. The disposition of the discharge tubes 14 and 15 is such that no direct light therefrom reaches the lenses 5 and, in addition, shields 16 and 17 are provided, mounted on transparent discs 18 and 19, to prevent light falling upon the lens 5 directly from the opposed parts of the circular discharge tubes 14 and 15. By this means the only light incident upon any lens is light reflected from the opposed surface 2 of the cylinder 1 or, when an object passes through the centrally-disposed transparent tube 10, from the object itself.

The field-stop 7 is in the form of a slit 20 in a metal disc, fixed to the end of the lens tubes 4, which disc is disposed in a plane parallel to the direction of movement of the object through the central transparent tube 10, so that when an object is passed through the tube 10 a narrow band of the object is observed as it moves past the ends of the lens tubes 4; the slit 20 is inclined to the direction of movement of the object at an angle of 90° but may, if desired, be inclined at a lesser angle. The aperture stop 6 may be in the form of an iris diaphragm, and thus be adjustable.

Mounted in the plug 22 in the hole 3 in the cylinder 1 and in contact with the field-stop 7 which is disposed at the radially outward end of the lens tubes 4, is the end of a glass rod 21 which, therefore, receives light passing through the slit 20 which light has been concentrated thereupon by the lens 5.

The three glass rods 21 operably connected to each of the three above-mentioned lens tubes 4 are preferably of the same length (to ensure, so far as possible, equal losses of light in passage along the length of the rod) and each of the rods is bent so that their free ends are brought, parallel and side by side, to a common viewing position and the light rays emanating from the three rods 21 are caused to illuminate the photo-sensitive surface 23 of a light-sensitive cell 24, response of which selectively operates a selecting or rejecting device (not shown) in accordance with the intensity of light reflected from the object.

Thus, with an object passing through the central transparent tube 10 and being generally light-colored and bearing a small dark stain, there will be a drop in the total amount of light passing through the three rods 21 when the dark stain is viewed by one or other of the three lens tubes 4 so that there is a diminution in the intensity of illumination of the photo-sensitive surface 23 of the light-sensitive cell 24 producing a response which differs from that of the remaining parts of the object and of the background 2. The intensity of illumination of the background 2 (i. e. the painted internal surface of the cylinder) is adjusted so that the light reflected from an object which is normal is equal to the light reflected from the background as viewed by the light-sensitive cell.

As previously indicated, it is an advantage to distribute the light incident upon the photo-sensitive surface of a light-sensitive cell uniformly over a fixed area of the said surface and consequently a rectangular block of glass 25 (i. e. the common rod earlier referred to) is placed so as to abut against the remote ends of the three glass rods 21, i. e. to be disposed between the ends of the rods 21 and the light-sensitive cell 24; by this means, if the light passing through one rod 21 is less, due to the presence, on an object being viewed, of a dark stain, then the total illumination reaching the photo-sensitive surface 23 of the light-sensitive cell 24 is also less but is a reduction in the general intensity over a substantially uniform area of the photo-sensitive surface 23.

The construction of the present invention overcomes disadvantages in prior arrangements in that it makes possible the viewing of objects from a plurality of spaced viewpoints thus reducing the possibility of a non-standard article failing to be detected by reason of the surface defect being disposed away from the viewing means.

It will be appreciated that while in the foregoing description reference has been made to the use of three viewing means each comprising a lens and field-stop and disposed radially around the cylinder in the same plane, more or less of such viewing means may be disposed around the circumference of the cylinder and some, at least, may be disposed at an angle to the transverse plane thereof so as to view the leading or trailing surface of a moving object or both the leading and trailing surfaces by disposing the viewing means or some of them at opposing angles to the transverse plane of the cylinder.

The apparatus of the invention can be applied to a wide variety of uses other than those described above; for example, it can be used to compare the intensity or colour of light from different sources. In such a case, the light from each source is conducted to a common point of observation where the two or more beams of light can be visually compared; for example, in color comparators, one source of light may be of a standard color and another source of light may be that reflected from or transmitted by an object whose color is to be determined. Thus light from the said object is conducted to the common point of observation by means of a rod whose terminal end has a common side edge with the terminal end of a rod which conducts light transmitted through one or more standard color transparencies or reflected from a plurality of differently colored reflecting surfaces so that the eye may view a single divided area, which is composed of the two or more different beams of light, which is the ideal condition for comparison.

The apparatus of the invention may also be adapted to distinguish light of different colors, for example by appropriately colouring rods of transparent material or by associating therewith one or more color filters; in this way, objects of a particular color or group of colors may be sorted by means of a photo-sensitive element to separate out from a batch of such objects those which are of a different color or which have surface areas which are differently-colored by employing color filters which do not transmit the said different colored light. Thus, despite the fact that the light reflectance of the differently-colored object or part of the object may not differ substantially from objects or parts thereof which are of the particular color or group of colors, the differently-colored articles can be distinguished and selected by means of a selector device as above referred to.

The invention also includes a method of sorting articles in accordance with their surface reflectance characteristics which comprises controlling sorting means by a photo-sensitive element excited by light conveyed thereto from a plurality of parts of the surface of a single article and further includes a method of sorting articles which comprises substantially simultaneously viewing the light reflected from a plurality of parts of the surface of a single article at a single viewing position.

I claim:

1. In an apparatus for sorting objects by the observation and measurement of light reflected by said objects and having selector means to select or reject objects to be sorted, the combination of illuminating means disposed around an object viewing position, a plurality of light receiving means disposed around and directed at said object viewing position to view at least the major portion of a circumferential strip of an object in said object viewing position and to receive light reflected directly from an object therein, said light receiving means being shielded from the direct light from said illuminating means, a plurality of light conducting solid rods, one connected directly to each of said plurality of light receiving means for conducting all of the reflected light received by said light receiving means directly to a single place of observation, and means at said single place of observation for viewing said reflected light and actuating said selector means to select or reject objects to be sorted in response to the intensity of said reflected light.

2. In an apparatus for sorting objects by the observation and measurement of light reflected by said objects and having selector means to select or reject objects to be sorted, the combination of illuminating means disposed around an object viewing position, a plurality of light receiving means disposed around and directed at said object viewing position to view at least the major portion of a circumferential strip of an object in said object viewing position and to receive light reflected directly from an object therein, said light receiving means shielded from the direct light from said illuminating means, a plurality of light conducting solid rods, one connected directly to each of said plurality of light receiving means for conducting all of the reflected light received by said light receiving means directly to a single place of observation with an intensity equal to the intensity of light conducted by each of the light conducting means, and means at said single place of observation for viewing said reflected light and actuating said selector means to select or reject objects to be sorted in response to the intensity of said reflected light.

3. The combination as claimed in claim 2 in which said light receiving means comprises a lens and a field stop and an adjustable aperture stop for limiting the area through which light is admitted to said light receiving means.

4. The combination as claimed in claim 2 in which said light conducting means comprises a light conducting rod, each of said plurality of light conducting rods being the same length as the other light conducting rods of said plurality.

5. In an apparatus for sorting objects by the observation and measurements of light reflected by said objects and having sorting means to select or reject objects to be sorted, the combination of illuminating means disposed around and illuminating an object viewing position, a uniform light reflecting background disposed around said viewing position, a plurality of light receiving means circumferentially disposed around said object viewing position to receive light from at least a circumferential strip thereof, and each comprising a lens, a field stop and an aperture stop, shields between said illuminating means and said light receiving means shielding said light receiving means from the direct light from said illuminating means, a plurality of light conducting rods, one connected directly to each light receiving means, and each rod being the same length as the other rods of said plurality of rods and terminating at a single place of observation, and photo-sensitive means at said single place of observation for viewing the reflected light conducted by said light conducting rods and actuating said selector means to select or reject objects being sorted in response to the intensity of the reflected light from said objects.

6. The combination as claimed in claim 5 and further light conducting means between the ends of said light conducting rods and said viewing means comprising a common light conducting rod positioned to receive the light from all of said light conducting rods and mixing said light by internal reflection within said common light conducting rod.

7. In an apparatus for the observation and measurement of light reflected by objects, the combination of illuminating means disposed around and illuminating an object viewing position, a plurality of light receiving means disposed around and directed at said object viewing position to view at least the major portion of a circumferential strip of an object in said object viewing position and to receive light reflected directly from an object therein, said light receiving means being shielded from the direct light from said illuminating means, a plurality of light conducting rods, one connected directly to each light receiving means and terminating at a single place of observation, photo-sensitive means at said single place of observation for viewing the reflected light conducted by said light conducting rods and measuring the intensity of said reflected light, and a common light conducting rod between said photo-sensitive means and the ends of said light conducting rods to receive the light from said light conducting rods and mix it by internal reflection within said common light conducting rod.

8. In an apparatus for the observation and measurement of light reflected by objects and having an illuminated object viewing position, the combination of a plurality of light receiving means disposed around and directed at said object viewing position to view at least the major portion of a circumferential strip of an object in said object viewing position and to receive light reflected directly from an object therein, said light receiving means being shielded from the direct light from said illuminating means, a plurality of light conducting rods, one connected directly to each light receiving means and terminating at a single place of observation, photo-sensitive means at said single place of observation for viewing the reflected light conducted by said light conducting rods and measuring the intensity of said reflected light, and a common light conducting rod between said photo-sensitive means and the ends of said light conducting rods to receive the light from said light conducting rods and mix it by internal reflection within said common light conducting rod.

9. In an apparatus for sorting objects by the observation and measurement of light reflected by said objects and having selector means to select or reject objects to be sorted, the combination of illuminating means disposed around an object viewing position, a plurality of light conducting rods having their one ends disposed around and directed at said object viewing position to view at least the major portion of a circumferential strip of an object in said object viewing position and to receive light reflected directly from an object therein, said one ends being shielded from the direct light from said illuminating means, said rods extending to a single place of observation for conducting all of the reflected light received by said rods directly to said single place of observation, and means at said single place of observation for viewing said reflected light and actuating said selector means to select or reject objects to be sorted in response to the intensity of said reflected light.

References Cited in the file of this patent

UNITED STATES PATENTS

| | | |
|---|---|---|
| 1,556,766 | Ybarrondo | Oct. 13, 1925 |
| 1,945,395 | Cockrell | Jan. 30, 1934 |
| 1,981,999 | French | Nov. 27, 1934 |
| 1,996,233 | Darrah | Apr. 2, 1935 |
| 2,066,934 | Gulliksen | Jan. 5, 1937 |
| 2,244,826 | Cox | June 10, 1941 |
| 2,256,595 | Metcalf | Sept. 23, 1941 |
| 2,337,535 | Acs | Dec. 28, 1943 |
| 2,410,956 | Benjamin | Nov. 12, 1946 |
| 2,505,420 | McCraray et al. | Apr. 25, 1950 |
| 2,506,672 | Kell et al. | May 9, 1950 |
| 2,583,132 | Altar et al. | Jan. 22, 1952 |
| 2,613,809 | Potts | Oct. 14, 1952 |
| 2,646,880 | Frankel | July 28, 1953 |
| 2,656,923 | Cox | Oct. 27, 1953 |

FOREIGN PATENTS

| | | |
|---|---|---|
| 294,575 | Great Britain | July 20, 1928 |
| 470,638 | Great Britain | Aug. 17, 1937 |